United States Patent
Dogan et al.

(10) Patent No.: US 12,271,938 B1
(45) Date of Patent: *Apr. 8, 2025

(54) SYSTEM AND APPARATUS TO PRESENT PREDICTED ITEMS

(71) Applicant: Amazon Technologies, Inc., Seattle, WA (US)

(72) Inventors: Ozgur Dogan, Seattle, WA (US); Gianna Lise Puerini, Seattle, WA (US); Michael Cordell Mountz, Lexington, MA (US); Steve Kessel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 174 days.

This patent is subject to a terminal disclaimer.

(21) Appl. No.: 18/046,132

(22) Filed: Oct. 12, 2022

Related U.S. Application Data

(60) Continuation of application No. 17/110,037, filed on Dec. 2, 2020, now Pat. No. 11,475,503, which is a continuation of application No. 16/450,815, filed on Jun. 24, 2019, now Pat. No. 10,861,078, which is a division of application No. 14/229,380, filed on Mar. 28, 2014, now Pat. No. 10,332,183.

(51) Int. Cl.
*G06Q 30/00* (2023.01)
*G06Q 10/087* (2023.01)
*G06Q 30/0601* (2023.01)

(52) U.S. Cl.
CPC ....... *G06Q 30/0631* (2013.01); *G06Q 10/087* (2013.01)

(58) Field of Classification Search
None
See application file for complete search history.

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,280,547 B2 | 10/2012 | D'Andrea et al. |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Mila Airapetian
(74) *Attorney, Agent, or Firm* — Athorus. PLLC

(57) ABSTRACT

This disclosure describes a system for fulfilling items at a materials handling facility. In some instances, a predicted items list that identifies items that are likely to be picked by a user are determined and, when the user arrives at the materials handling facility, those predicted items are presented to the user for selection. For example, predicted items may be determined and an inventory holder that holds one or more of those predicted items may be retrieved by a mobile drive unit (such as a Kiva mobile drive unit) and presented to the user at a retrieval area. The user may pick the items they desire from the presented inventory holder.

20 Claims, 10 Drawing Sheets

(56) References Cited

U.S. PATENT DOCUMENTS

| | | |
|---|---|---|
| 8,423,431 B1 | 4/2013 | Rouaix et al. |
| 8,630,924 B2 | 1/2014 | Groenevelt et al. |
| 8,666,791 B1 | 3/2014 | Fedele |
| 8,688,598 B1 | 4/2014 | Shakes et al. |
| 9,415,935 B1 | 8/2016 | Macfarlane |
| 9,473,747 B2 | 10/2016 | Kobres et al. |
| 2003/0002712 A1 | 1/2003 | Steenburgh et al. |
| 2004/0181467 A1 | 9/2004 | Raiyani et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2009/0121017 A1 | 5/2009 | Cato et al. |
| 2009/0185884 A1 | 7/2009 | Wurman et al. |
| 2009/0240511 A1 | 9/2009 | Darrouzet |
| 2009/0245573 A1 | 10/2009 | Saptharishi et al. |
| 2011/0011936 A1 | 1/2011 | Morandi et al. |
| 2012/0004769 A1* | 1/2012 | Hallenbeck ............ G07F 11/62 700/232 |
| 2012/0143427 A1 | 6/2012 | Hoffman et al. |
| 2012/0284132 A1 | 11/2012 | Kim et al. |
| 2012/0298688 A1 | 11/2012 | Stiernagle |
| 2013/0076898 A1 | 3/2013 | Philippe et al. |
| 2013/0173049 A1* | 7/2013 | Brunner ................ G06Q 10/08 700/216 |
| 2013/0253700 A1 | 9/2013 | Carson et al. |
| 2013/0262251 A1 | 10/2013 | Wan et al. |
| 2014/0279294 A1 | 9/2014 | Field-Darragh et al. |
| 2014/0343713 A1* | 11/2014 | Ziegler ................ G06Q 10/08 700/214 |
| 2014/0362223 A1 | 12/2014 | LaCroix et al. |
| 2015/0019391 A1 | 1/2015 | Kumar et al. |
| 2015/0073907 A1 | 3/2015 | Purves et al. |
| 2016/0104220 A1 | 4/2016 | Stiernagle |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

SYSTEM AND APPARATUS TO PRESENT PREDICTED ITEMS

PRIORITY CLAIM

This application is a Continuation of U.S. patent application Ser. No. 17/110,037, filed Dec. 2, 2020, which is a Continuation of U.S. Pat. No. 10,861,078, filed Jun. 24, 2019, issued Dec. 8, 2020, and titled "Item Retrieval Area Apparatus," which is a Divisional of U.S. Pat. No. 10,332,183, filed Mar. 28, 2014, issued Jun. 25, 2019 and titled "Fulfilling Items to Users," the contents of each of which are incorporated herein by reference in their entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

Many of those physical stores also maintain inventory in a storage area, or fulfillment centers, that can be used to replenish inventory located in the shopping areas and/or to satisfy orders for items that are placed through other channels (e.g., e-commerce). Other examples of entities that maintain inventory include libraries, museums, rental centers, and the like. In each instance, the user (e.g., picker, user, customer) must first locate the item and retrieve the item for use and/or purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
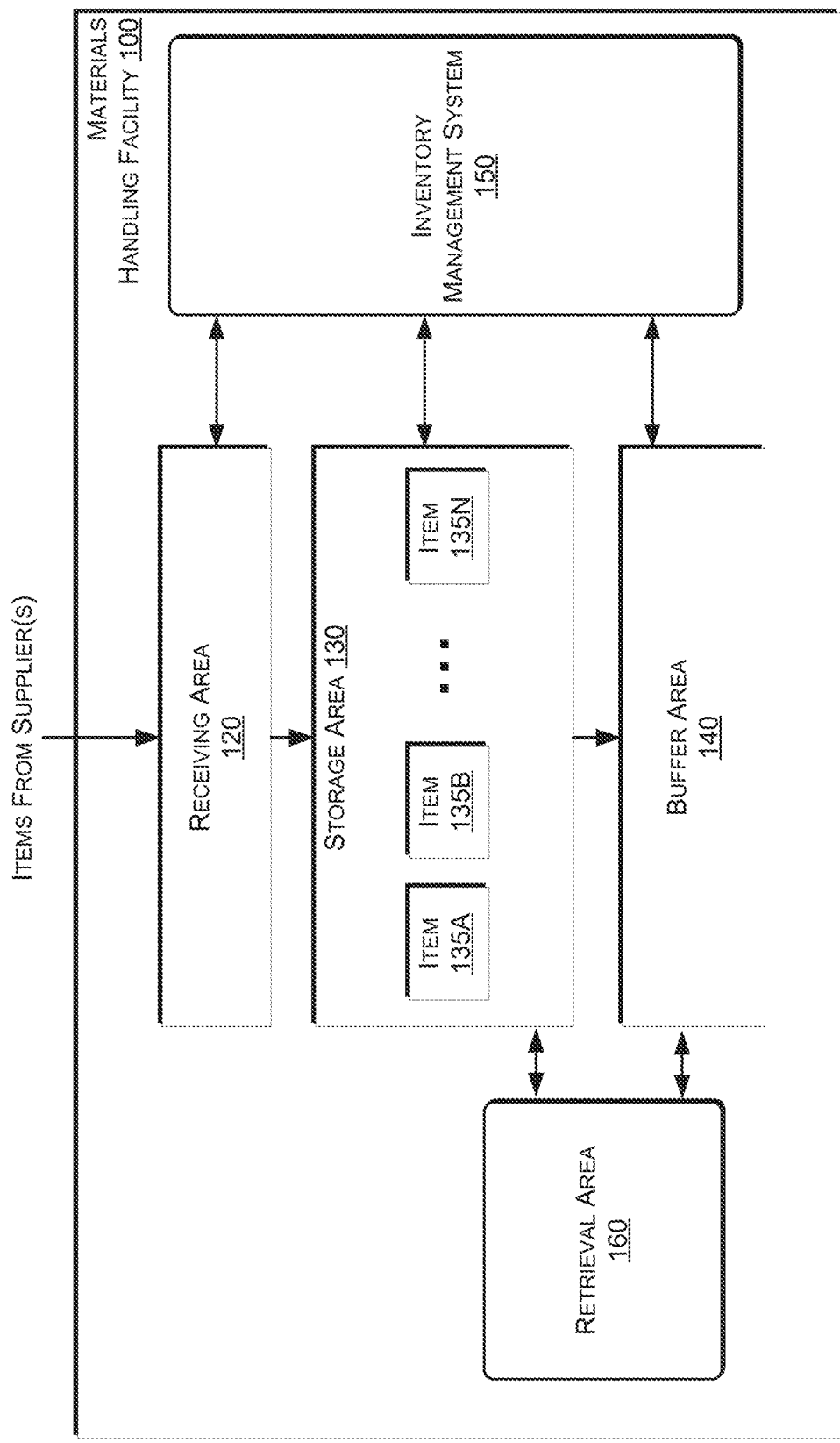
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes a system for fulfilling items at a materials handling facility. In some instances, a predicted items list that identifies items that are likely to be picked by a user are determined and, when the user arrives at the materials handling facility, those items are presented to the user for selection. For example, items likely to be picked by a user may be determined and an inventory holder that holds one or more of those items may be retrieved by a mobile drive unit (such as a Kiva mobile drive unit) and presented to the user at a retrieval area. The user may pick the items they desire from the presented inventory holder. In some implementations, the inventory holder may be curated to include all of the items on the predicted items list. In such an implementation, the inventory holder, which contains the items identified on the predicted items list, may be retrieved by a mobile drive unit and presented to the user, so that the user can select items of interest. In other implementations, rather than consolidating items identified on the item list into a single inventory holder, inventory holders containing one or more of the items may be retrieved and presented to the user.

The location of predicted items on the presented inventory holder may be distinguished to assist the user in identifying the item. For example, the location of a predicted item may be illuminated using an illumination element (e.g., light). After the user selects the item, or indicates that they are not interested in the item, the inventory holder may be removed and another inventory holder with one or more additional predicted items may be presented to the user. This process may continue until the user has been presented with each predicted item, or until the user indicates that they do not want to see any further predicted items (e.g., the user leaves the retrieval area).

In some implementations, in addition to presenting items identified on a predicted items list, supplementary items may be included on a presented inventory holder for presentation to the user. Supplementary items may include, for example, items that are often bought with items on the item list, promotional items, advertised items, free sample items, etc. The user may pick a predicted item and/or a supplementary item.

In some implementations, the inventory management system may monitor the materials handling facility and detect the arrival of a user. For example, if the inventory management system knows the identity of the user, the license plate of the user's car, or other identifying information, it may detect when the user has arrived at the materials handling facility. In other implementations, the user may be identified as the user enters the materials handling facility. For example, one or more images of the user may be captured and processed using facial recognition to identify the user. Alternatively, or in addition thereto, the user may provide identifying information, such as a user name, badge, identifier, biometric information, etc.

Upon detecting the arrival, the inventory management system may initiate the consolidation of items on a predicted items list associated with the user. Consolidation may be initiated by the inventory management system generating and/or issuing instructions to a picking agent, mobile drive unit, etc., to begin picking the items identified on the predicted items list from the materials handling facility and consolidating those items on a single inventory holder for presentation to the user.

As discussed further below, the retrieval area may be configured such that a mobile drive unit may deliver items to the user. Rather than the user having to walk around the materials handling facility searching for items, the user can interact with the inventory management system at the retrieval area and have desired items and/or items identified on the predicted items list delivered to the user at the retrieval area.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to fulfill items selected by a user is illustrated in FIG. 1. As shown, a materials handling facility 100 includes a receiving area 120, a storage area 130 configured to store an arbitrary number of inventory items 135A-135N, and one or more buffer areas 140 configured to temporarily hold consolidated inventory holders. The materials handling facility may also include a retrieval area 160 (described in further detail below). The arrangement of the various areas within materials handling facility 100 is depicted functionally rather than schematically. For example, in some implementations, multiple different receiving areas 120, storage areas 130, buffer areas 140, and/or retrieval areas 160 may be interspersed rather than segregated. Likewise, one or more of the areas may be combined. For example, the retrieval area 160 and the storage area 130 may be combined into a single area.

Additionally, the materials handling facility 100 includes an inventory management system 150 configured to interact with each of receiving area 120, storage area 130, buffer area 140, retrieval area 160 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one inventory location or inventory holder within the storage area 130. In other implementations, like items 135 may be stored in different locations and/or different inventory holders. For example, to optimize retrieval of certain items 135 having high turnover within a large physical facility, those items 135 may be stored in several different inventory locations to reduce congestion that might occur at a single point of storage. In some implementations, some items may also be stored and accessible for retrieval by a user within the retrieval area 160. In general, the inventory management system 150 may maintain a mapping or location information identifying where within the materials handling facility each item is stored. Each inventory item may be associated with the corresponding location in which it is stored and the association may be maintained in an inventory data store 915 (FIG. 9) accessible by the inventory management system 150.

When items on a predicted items list are to be retrieved and presented to a user for selection, an inventory holder that contains one or more of the predicted items may be "picked" from inventory locations within the storage area 130. For example, in one implementation, a mobile drive unit, such as a Kiva mobile drive unit, may receive instructions to pick an inventory holder from the storage area 130 and deliver the inventory holder to a retrieval area 160. In other implementations, a user may interact with the inventory management system 150 via an interface at the retrieval area 160, select items, and the inventory holder containing one or more of those items may be picked from an inventory location and delivered to the retrieval area 160 for retrieval by the user.

As discussed in more detail below, a user may select items while in the materials handling facility 100, be presented predicted items determined to likely be of interest to the user, and/or pre-order or confirm items identified on the predicted items list and/or remove an item from the predicted items list. In some instances, predicted items may be determined based on past purchases or picks by the user. For example, if a user picks paper towels every time they are at the materials handling facility, that recurring behavior may be detected and paper towels may be added to the predicted items list. The next time the user arrives at the materials handling facility, an inventory holder that includes paper towels may automatically be presented to the user for selection.

While in the materials handling facility, the user may participate in a selection process, selecting one or more items that the user desires to remove from the materials handling facility. For example, the user may be selecting items for purchase, rental, and/or to borrow that the user desires to take with them when they leave the materials handling facility. As the user selects the items, an identifier associated with the items may be added to a user item list.

In some implementation, the materials handling facility 100 may include a retrieval area 160. As discussed in further detail below, the retrieval area 160 allows a user to communicate with the inventory management system 150, receive information about items 135 and/or select items 135 from inventory that the user desires to remove from the materials handling facility. For example, inventory holders that include items identified on a predicted items list may be retrieved and presented to the user for selection at the retrieval area 160. In some implementations, the retrieval area 160 may include a touch-based display configured to present item information to a user and receive selections of items from the user. The touch-based display may be part of a control station, as discussed further below with respect to FIG. 3.

Figure 2:
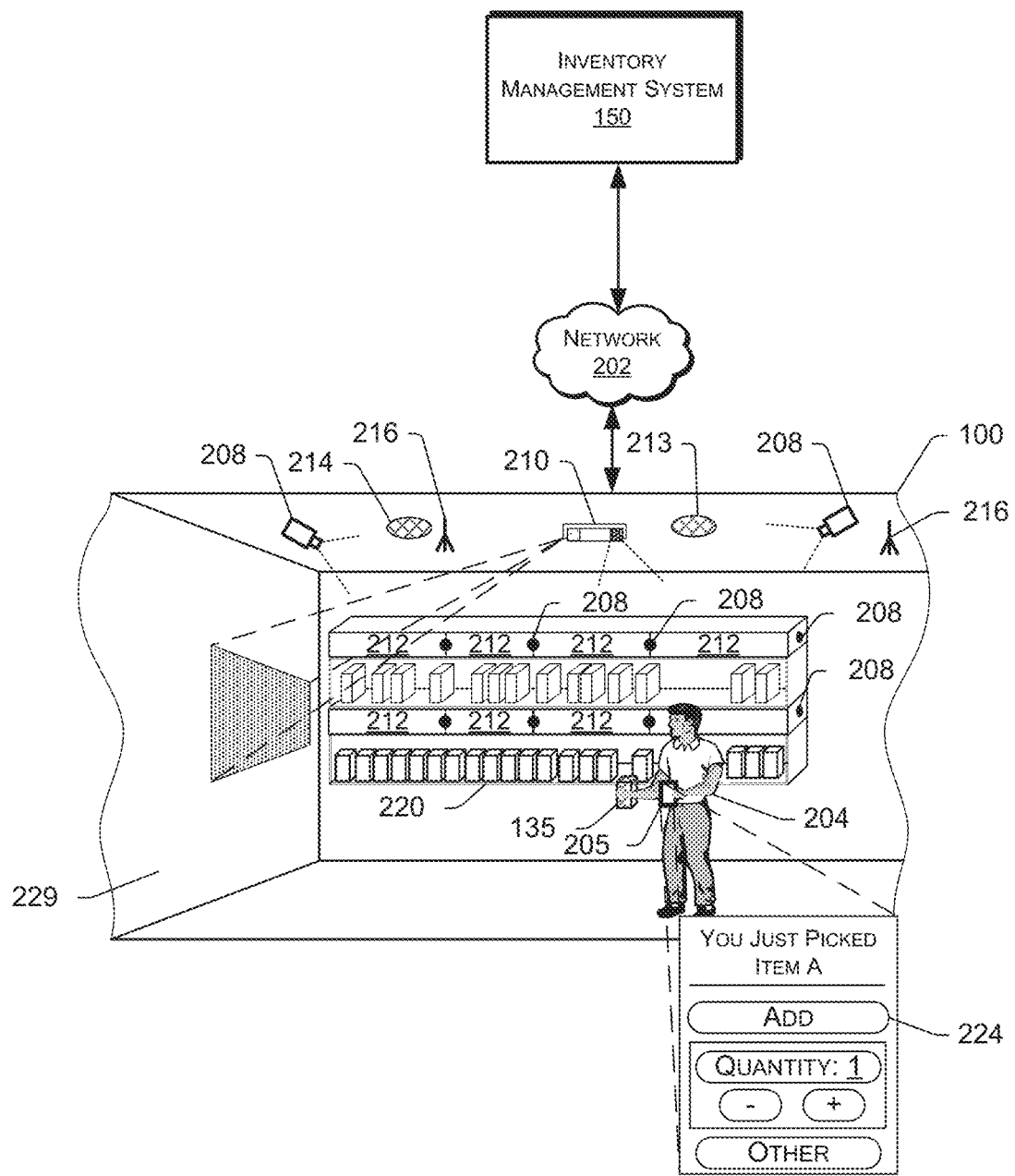
FIG. 2 is a block diagram illustrating additional details of a materials handling facility, according to some implementations.

FIG. 2 shows additional components of the materials handling facility 100, according to some implementations. Generally, the materials handling facility 100 may include one or more image capture devices, such as cameras 208. For example, one or more cameras 208 may be positioned in locations of the materials handling facility 100 so that images of items and/or users within the materials handling facility 100 can be captured. In some implementations, the image cameras 208 may be positioned overhead, such as on the ceiling to capture images of users, locations within the materials handling facility and/or items within the materials handling facility. In addition, in some implementations, one or more cameras 208 may be positioned at and/or inside of inventory locations 220 and/or on inventory holders. For example, a series of cameras 208 may be located on external portions of the inventory locations 220 and positioned to capture images of users, the location surrounding the inventory location 220 and/or items as they are placed into the inventory location or picked from the inventory location or an inventory holder. Likewise, one or more cameras 208 may be positioned within the inventory locations 220 or in inventory holders to capture images of items stored in the inventory locations 220 and/or images of objects (e.g., items, hands) moving into and/or out of the inventory locations 220 and/or inventory holders.

Any type of camera and/or configuration of cameras may be used with the implementations described herein. For example, one or more of the cameras may be RGB cameras. In other implementations, one or more of the cameras may be depth sensing cameras.

In addition to cameras, other input devices, such as pressure sensors, infrared sensors, a scale, a volume displacement sensor, a light curtain, radio frequency identifier ("RFID") tag scanner, visual code reader (e.g., barcode reader, bokode reader, QR code reader), etc., may be utilized with the implementations described herein. For example, a pressure sensor and/or a scale may be used to detect when an item is added and/or removed from inventory locations. Likewise, an infrared sensor may be used to distinguish between a user's hand and inventory items. In still other implementations, a visual code or tag may be located on the items such that the items can be identified by a visual code reader.

In some implementations, a user may select an item 135 and provide an indication to the inventory management system 150 that the user desires to remove the item from the materials handling facility 100. For example, if the materials handling facility is a library, the user may indicate that they desire to checkout a book and take the book with them when they leave the materials handling facility 100. The user may take the item 135 (e.g., book) that they selected from the inventory location.

In some implementations, the user may select an item through interaction with one or more input devices located within the materials handling facility. For example, a display 212 may be a touch based display that provides selection information to the user allowing the user to select items that the user desires to remove from the inventory location and/or to obtain information about items. In other implementations, one or more image capture devices, such as cameras 208, may capture images of the user and/or the selected items. Those images may be processed by the inventory management system 150 to identify the user and/or to determine the item selected by the user.

In some implementations, a user 204 located in the materials handling facility 100 may possess a portable device 205 and obtain information about items 135 located within the materials handling facility 100 via the portable device and/or select items 135 that the user desires to remove from the materials handling facility 100. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device 205 as well as identify the user, communicate with the user via other means and/or communicate with other components of the inventory management system 150.

The inventory management system 150 may also include other input/output devices, such as projectors 210, displays 212, speakers 213, microphones 214, etc., to facilitate communication between the inventory management system 150 and the user 204. In some implementations, multiple input/output devices may be distributed within the materials handling facility. Likewise, the inventory management system 150 may also include one or more communication devices, such as wireless antennas 216, that facilitate wireless communication (e.g., Wi-Fi, Near Field Communication (NFC), Bluetooth) between the inventory management system 150 and the portable device 205. The inventory management system 150 may also include one or more computing resource(s) 203 (FIG. 5) that may be local to the environment (e.g., materials handling facility), remote from the environment, or any combination thereof.

The inventory management system 150 may utilize antennas 216 within the materials handling facility to create a local wireless network 202 (e.g., Wi-Fi) so that the portable device 205 can connect to and communicate with the inventory management system 150. Likewise, in instances when one or more of the components of the inventory management system 150 are remote from the materials handling facility, they may communicate with other components of the inventory management system 150 and/or the portable device 205 via the network 202.

The following is an example use case for presenting items at the retrieval area 160 of the materials handling facility 100. As discussed below, based on user information (e.g., past purchase history, time since last purchase, items often purchased together) and/or item information (e.g., items often purchased together, complementary items, substitute items), a predicted item list for a user may be established that includes an item identifier for items that are likely to be of interest to the user. For example, if the user picks paper towels on a consistent basis, it may be determined that the user is likely to pick paper towels. Accordingly, paper towels may be added to the predicted items list for presentation to the user. When the user arrives at the materials handling facility, or while located in the materials handling facility, the user may receive a notification that predicted items are available for review and selection at the retrieval area 160. When it is determined that the user is positioned at a retrieval area 160, a first inventory holder that contains items identified on the potential item list is presented to the user and the user may select the presented predicted item and/or select other items included on the inventory holder. When the user selects an item, the item is added to an item identifier list associated with the user.

Figure 3A:
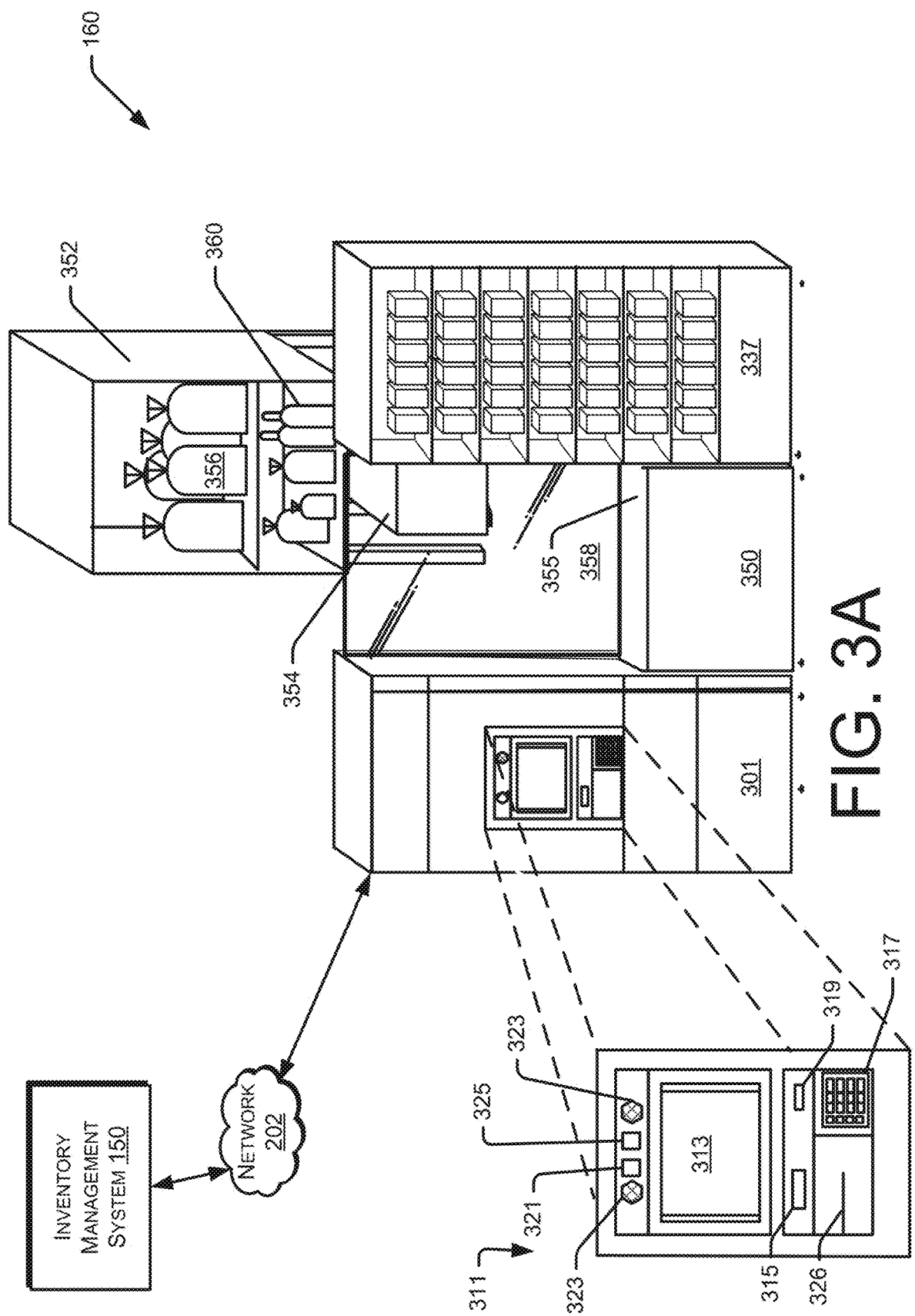
FIGS. 3A-3B are block diagrams illustrating a retrieval area within a materials handling facility, according to some implementations.
Figure 3B:
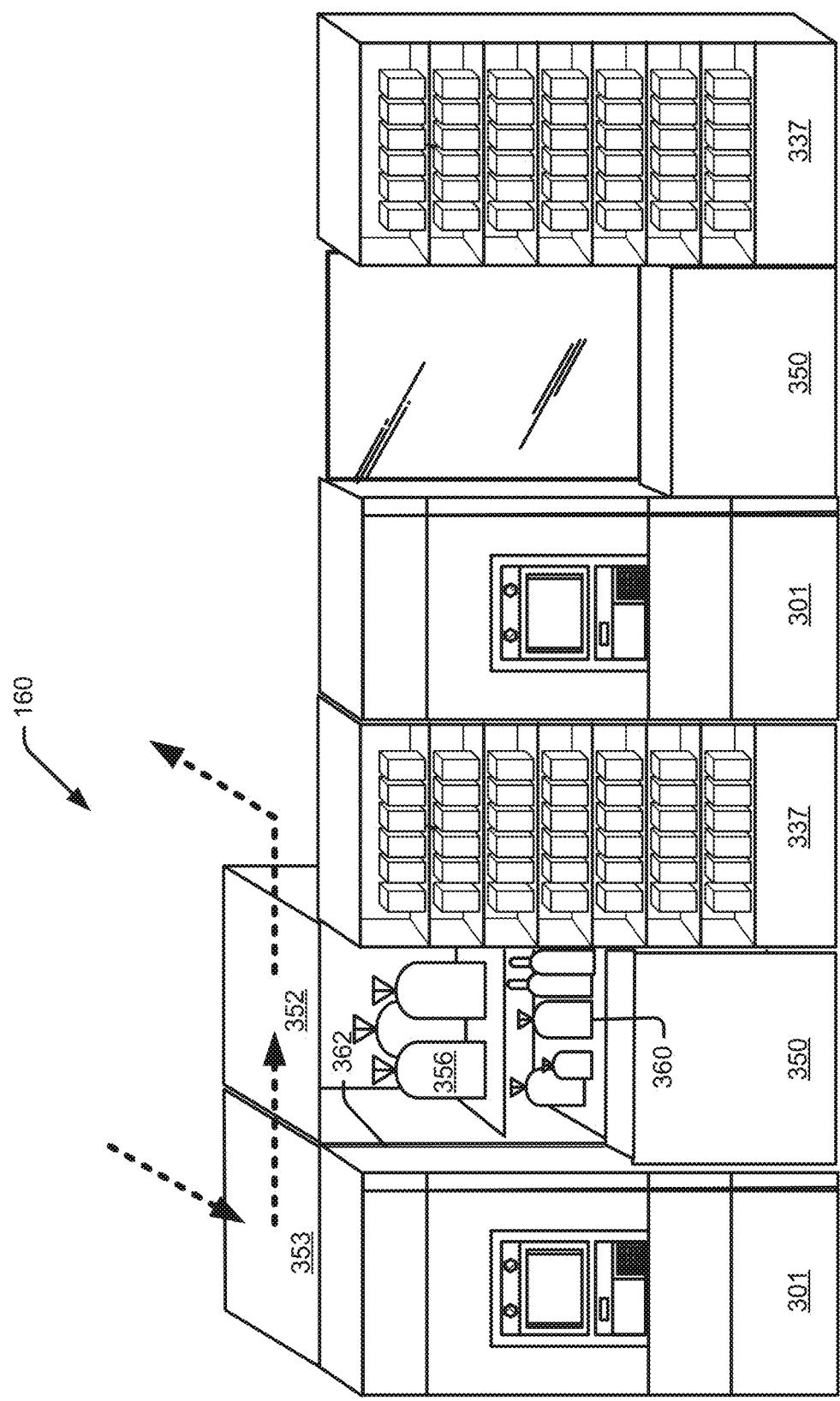

FIGS. 3A-3B show additional components of the retrieval area 160 of the materials handling facility 100, according to some implementations. The retrieval area 160 may include one or more control stations 301, one or more item delivery areas 350, and one or more inventory locations 337. The control station 301, item delivery area 350 and/or the inventory location 337 may be a single unit positioned to separate a user area from an area where mobile drive units operate. In other implementations, one or more of the control station 301, item delivery area 350 and/or inventory location 337 may be modular components that can be connected together in different configurations. In some implementations, as discuss further below with respect to FIG. 3B, control station 301, item delivery area 350 and/or inventory location 337 are each approximately the same width as a mobile drive unit and positioned so that mobile drive units can move behind each of the control station 301, item delivery area 350 and/or inventory location 337. For example, a first mobile drive unit may position an inventory holder at the item delivery area 350 to allow user access to items included on the inventory holder. A second mobile drive unit may position a second inventory holder behind the control station 301 so that when the first mobile drive unit moves the first inventory holder away from the item delivery area 350, the second mobile drive unit can move the second inventory holder into the item delivery area for presentation to the user. To facilitate transition of mobile drive units and inventory holders from the item delivery area 350, the inventory location 337 may be positioned so that as the first mobile drive unit moves the first inventory holder away from the item delivery area 350, it may move laterally behind the inventory area 337, rotate and then move away from the retrieval area 160. In an alternative implementation, the inventory area 337 may not be utilized. For example, while the first inventory holder is docked at the item delivery area 350 and presented to the user, the mobile drive unit may rotate so that it can move directly away from the item delivery area 350 when the user is done picking items from the first inventory holder. In either configuration, once the first mobile drive unit has moved the first inventory holder away from the item delivery area 350, the second mobile drive unit may move the second inventory holder into position at the item delivery area 350 for presentation of the second inventory holder to the user.

In general, the control station 301 acts as the location for interacting with, providing information to and receiving input from a user. The control station 301 may also act as a communication point for communicating with the inventory management system 150. For example, control station 301 may include an internal computing system (not shown), or other computing system, that is capable of communicating with the user, the item delivery area 350, the inventory location 337, input/output devices of the retrieval area 160 and/or the inventory management system 150.

The control station 301 may also include a user interface 311. The user interface 311 is configured to receive and provide information to one or more users of the control station 301 and may include, but is not limited to, a display 313, such as a touch-screen display, a scanner 315, a keypad 317, a biometric scanner 319, an audio transducer 321, one or more speakers 323, one or more image capture devices 325, such as a video camera, and any other types of input or output devices that may support interaction between the control station 301 and one or more users. For example, the user interface 311 may also include a credit card reader, the ability to accept money (such as cash or coins) and/or the ability to vend items (e.g., bags) using a vending slot 326. Providing the ability for the control station 301 to accept credit cards and/or money enables the delivery of items directly to the user while the user is interacting with control station 301. In other implementations, the user may be identified and an associated account charged for the items, rather than requiring use of a credit card or money payment at the control station 301.

The control station 301 may also include a connector component configured to provide wired and/or wireless network connectivity to remote computing devices, such as the inventory management system 150, via a network 202. Wireless connectivity may be implemented using a wireless antenna, which may provide both receive and transmit functionality.

The inventory locations 337 may be used to display items to users for selection and/or for removal. Each inventory location 337 may also include upper, bottom, side and rear surfaces configured to form a cavity in which items may be stored. In addition, each storage compartment may include various input/output components. For example, each inventory location may include a camera for detecting the removal or selection of items. In other implementations, the inventory locations may include a presence detection sensor, pressure sensors, infrared sensors, a scale, a volume displacement sensor, a light curtain, radio frequency identifier ("RFID") tag scanner, visual code reader (e.g., barcode reader, bokode reader, QR code reader), etc., for use in determining if an item has been removed from the inventory location. The input components, such as the presence detection sensor, scale, pressure sensor, etc., may be used to detect the removal of items from the inventory locations. Any items, such as impulse purchase items, frequently purchased items, advertised items, etc. may be placed into the inventory location and the user may pick items from the inventory location and/or from the inventory holders presented at the item delivery area 350.

The item delivery area 350 may include a barrier 358 that separates the user area from the areas where the mobile drive units operate. In this example, the barrier 358 is a clear material (e.g., glass), thereby allowing viewing by a user of the mobile drive units as they move within the materials handling facility. As discussed below with respect to FIG. 3B, the barrier may be movable to allow access by a user to items of an inventory holder when the inventory holder is docked at the item delivery area 350.

The item delivery area 350 may also include a shelf 355 onto which user selected items may be placed. For example, as inventory holders 352 are delivered to a user and the user selects items, the user may place those items on the shelf 355. In some implementations, the item delivery area may include one or more input components for detecting the presence of items. For example, a scale, pressure sensor, camera, etc., may be included on, in or near the shelf 355 to determine when an item is placed on the shelf 355.

The item delivery area 350 is also configured to receive an inventory holder 352 delivered by a mobile drive unit 354. Any type of mobile drive unit and/or inventory holder, such as those available from Kiva Systems, Inc., may be utilized with the implementations described herein. For example, the mobile drive unit and inventory holder offered by Kiva Systems, Inc., allows for automated transport of items. The inventory holder may be a shelf or series of shelves on which one or more items may be stored.

The inventory holder 352 may be any type of inventory holder, such as those available from Kiva Systems. In some implementations, the inventory holder, or a portion thereof, may include electrical components, such as illumination elements, scales, pressure sensors, load cells, refrigeration, cameras, microphones, displays, etc. In other implementations, the inventory holder, or a portion thereof, may be configured as a closed unit to provide, for example, cooling (refrigeration, freezer), a sterile environment, and/or a secure environment. For example, the inventory holder may contain high value items that are secured within a closed portion of the inventory holder. To access the secure portion of the inventory holder, the user may be required to provide a pin, access code, identifier, etc.

When the inventory holder docks with the item delivery area 350, it may receive power from the item delivery area to enable activation of one or more illumination elements (lights) that illuminate the items in the inventory holder. As another example, the inventory holder may be configured as a cooling unit and have a door on the front of the inventory holder. To pick an item out of the inventory holder, the user may open the door of the inventory holder while the inventory holder is docked with the item delivery area 350.

The mobile drive unit may be configured to receive commands from the materials handling facility instructing the mobile drive unit to move from one location (e.g., current location) to another (e.g., location of inventory holder) and retrieve (e.g., pick up or otherwise move) the inventory holder.

In some implementations, the user may interact with the user interface 311 and select items to receive. When selecting an item to receive, an inventory holder 352 containing inventory of the selected item may be identified and the inventory management system 150 may instruct a mobile drive unit 354 to retrieve the inventory holder 352 from the storage area and deliver the inventory holder to the item delivery area 350. The user may then pick the selected item from the inventory holder 352 and optionally place the item on the shelf 355 or into a tote.

In some implementations, if one or more items are identified on a predicted items list associated with the user, the user has confirmed that items on the predicted items list are of interest, and/or the user has pre-ordered one or more items, those items may be delivered to the user at the item delivery area 350 on an inventory holder 352 by a mobile drive unit 354. For example, if a predicted items list has been created that identifies five items, those items may be picked, consolidated, packed into a container 356, placed onto an inventory holder 352 and delivered to the user at the item delivery area 350 for presentation to and picking by the user. In another implementation, when the user arrives at the materials handling facility, the five items determined to be of potential interest may be picked by an agent and consolidated into a single inventory holder 352 but not packed into a container. When it is determined that the user has arrived at the item delivery area 350, the inventory holder 352 with the consolidated items may be retrieved and delivered by a mobile drive unit to the item delivery area 350 for presentation and picking of the items by the user. In still another implementation, rather than consolidating the items on the predicted items list, when the user arrives at the item delivery area 350, a first inventory holder containing one or more of the items identified on the predicted items list may be retrieved from the storage area by a mobile drive unit and delivered to the item delivery area 350 for presentation to the user and picking of the item from the inventory holder.

In some implementations, supplementary items 360 may also be included on the inventory holder 352. A user, while picking predicted items, may also pick one or more of the supplementary items from the inventory holder. Supplementary items 360 may include recommended items, items being advertised, items selected based on past user purchase history, items related to user selected items, items often retrieved or purchased with predicted items, high velocity items (items that are frequently removed from the materials handling facility), randomly selected items, etc.

FIG. 3B shows another configuration of the retrieval area 160, according to an implementation. In this illustration, two sets of retrieval areas 160 are shown side by side. Any number of retrieval areas 160 may be included in a materials handling facility.

As illustrated, a mobile drive unit (not shown) has docked with the item delivery area 350 and the barrier 358 has moved to allow access by the user to the items 356-360 included in the inventory holder 352. In addition, a second inventory holder 353 containing additional predicted items has also been delivered to the retrieval area and is positioned behind the control station 301 in a queue waiting to be presented to the user.

As illustrated by the arrows, inventory holders may be queued behind the retrieval area 160 for presentation to users to reduce the time between inventory holder presentations. For example, when the user has completed picking items from the presented inventory holder 352, a mobile drive unit may move the inventory holder 352 laterally behind the inventory location 337 away from the item delivery area 350, rotate and return the inventory holder 352 to storage, or another location. While the first inventory holder 352 is being moved away from the item delivery area 350, a second mobile drive unit (not shown) may move the queued inventory holder 353 into the item delivery area 350 for presentation to the user.

When an inventory holder is positioned or docked at the item delivery area 350, the barrier 358 may be moved along tracks 362, to allow access to the items by the user. For example, the barrier 358 in this example has moved laterally behind the control station 301. In other implementations, the barrier may move vertically, pivot, laterally in the other direction, etc.

When the user is done picking items, the barrier 358 may close and the inventory holder 352 may undock from the item delivery area 350 and be moved away by a mobile drive unit 354. If the user is interested in another inventory holder and/or if other predicted items are to be presented, another inventory holder 353 may be transitioned to the item delivery area 350, docked and presented to the user. In some implementations, the user may receive a representation on a display, such as the display 313 identifying the items that are about to be presented to the user on the next inventory holder.

Figure 4:
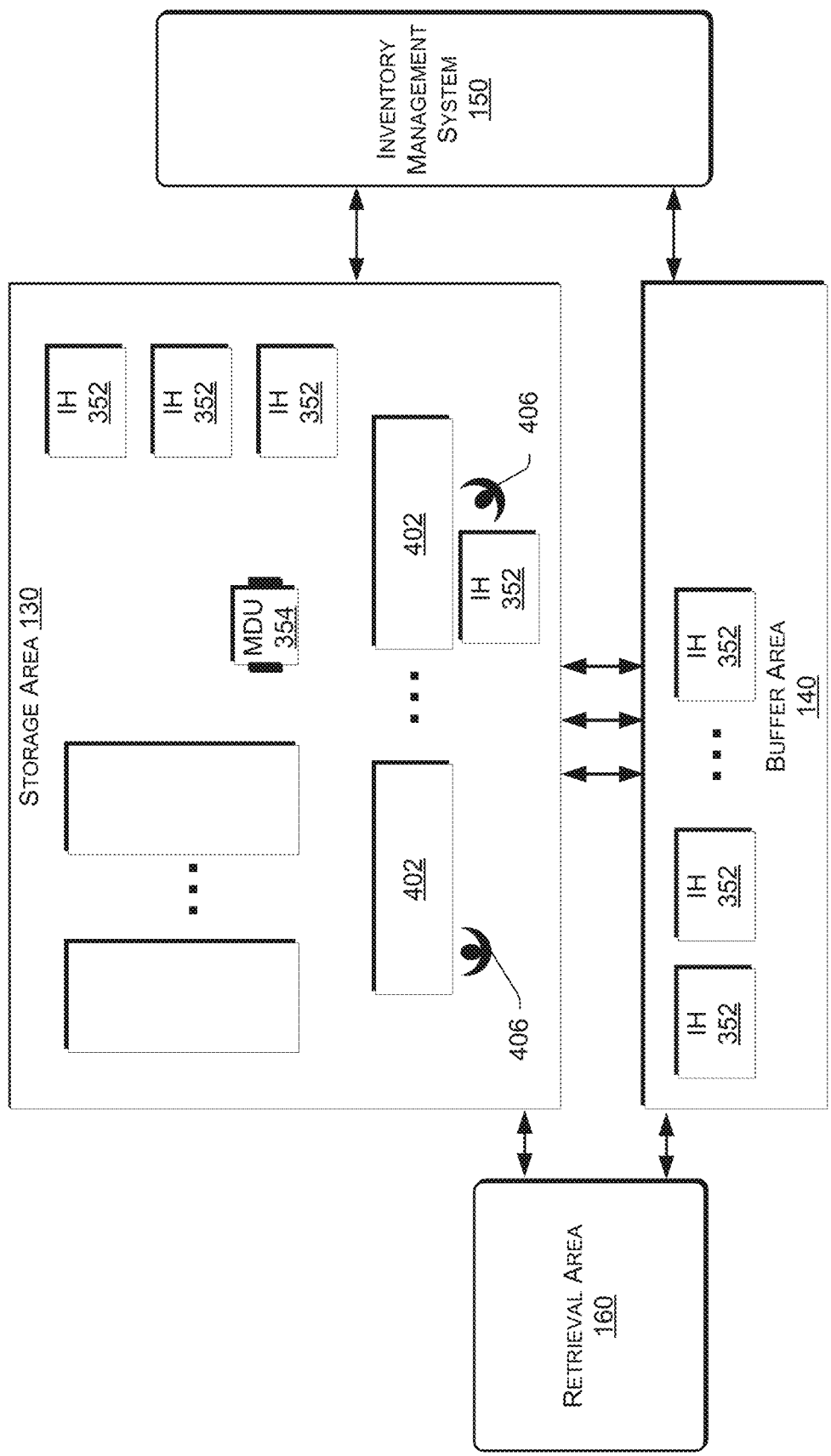
FIG. 4 is a block diagram illustrating additional details of a materials handling facility, according to some implementations.

FIG. 4 is a block diagram illustrating additional details of a materials handling facility, according to some implementations. As illustrated, in some implementations, the storage area 130 may be separate from the retrieval area 160, and/or the buffer area 140. In other implementations, one or more of those areas may be consolidated. Likewise, as illustrated in FIG. 4, the storage area 130 may include sections for agent 406 picking of items as well as an area for picking of items using mobile drive units 354. While these sections of the area are shown as separated, in other implementations, the areas may be consolidated.

As illustrated, when an item is included on a predicted items list and it is determined that the user has arrived at the materials handling facility 100, the predicted items may be picked from the storage area 130 and delivered to a consolidation area 402. At the consolidation area 402, one or more agents 406 may consolidate the predicted items onto a single, curated inventory holder for the user. For example, if it has been determined that there are five items that are likely of interest to a user, each of those items may be picked and delivered to the consolidation area. An agent 406 at the consolidation area may consolidate those items into a single inventory holder that will be delivered to the user when the user is at the retrieval area 160. Once all items predicted items have been consolidated, and optionally supplementary items included, the agent 406 or a mobile drive unit 354 may place the inventory holder of predicted items into a buffer area 140 until they are delivered to an item delivery area 350 of the retrieval area 160 for presentation to the user.

Consolidating items in advance provides an efficient presentation process to the user. For example, if fifteen items are identified on the predicted items list, all of which are typically stored on separate inventory holders 352, rather than having fifteen inventory holders 352 presented to the user, the items may be consolidated and a single inventory holder 352 containing all of the items presented to the user.

Figure 5:
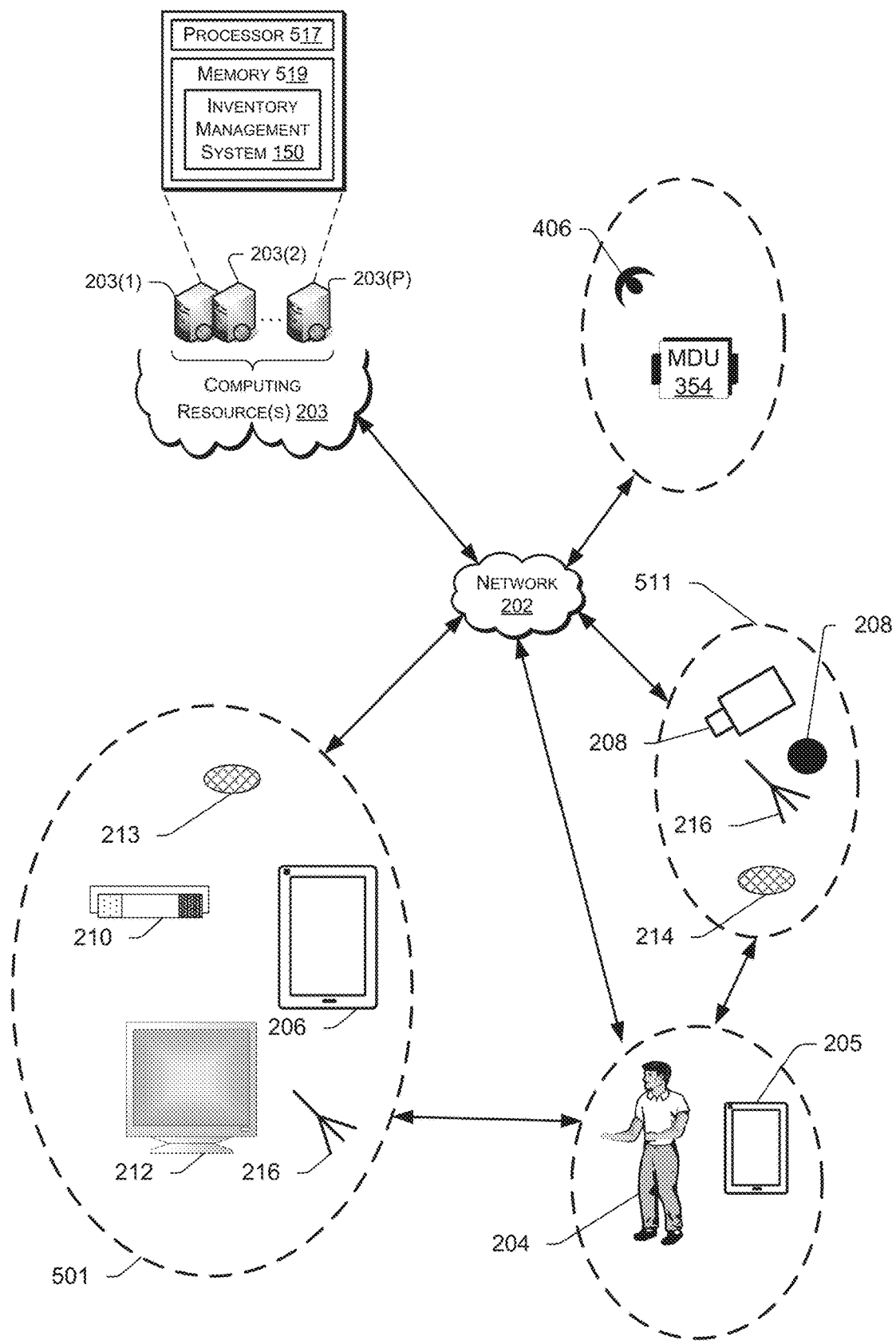
FIG. 5 is a block diagram illustrating components of a materials handling facility, according to some implementations.

FIG. 5 shows additional components and communication paths between component types utilized in a materials handling facility 100 with an inventory management system 150 of FIG. 1, in accordance with some implementations. As discussed above, the portable device 205 may communicate and interact with various components over a variety of communication paths. Generally, the inventory management system 150 and/or the materials handling facility may include input components 511, output components 501 and computing resource(s) 203. The input components 511 may include a camera 208, microphone 214, antenna 216, sensor (not shown), scale (not shown), light curtain (not shown), RFID scanner, visual identifier reader, or any other component that is capable of receiving input about the surrounding environment, from the user of the portable device and/or from the portable device. The output components 501 may include a projector 210, a portable device 206, a display 212, an antenna 216, a radio (not shown), speakers 213 and/or any other component that is capable of providing output.

The inventory management system 150 may also include computing resource(s) 203. The computing resource(s) 203 may be local to the environment (e.g., materials handling facility), remote from the environment, or any combination thereof. Likewise, the computing resource(s) 203 may be configured to communicate over a network 202 with input components 511, output components 501, agents 406, mobile drive units 354 and/or directly with the portable device 205 and/or the user 204.

As illustrated, the computing resource(s) 203 may be remote from the environment and implemented as one or more servers 203(1), 203(2), . . . , 203(P) and may, in some instances, form a portion of a network-accessible computing platform implemented as a computing infrastructure of processors, storage, software, data access, and so forth that is maintained and accessible by components/devices of the inventory management system 150 via a network 202, such as the Internet. For example, the computing resources 203 may process images to determine whether an item has been removed from an inventory holder (or inventory location) or placed into an inventory holder (or inventory location). Likewise, the computing resources 203 may determine pick paths for agents 406 and/or mobile drive units 354 for picking/retrieving and delivering selected items and/or inventory holders. The computing resource(s) 203 do not require end-user knowledge of the physical location and configuration of the system that delivers the services. Common expressions associated for these remote computing resource(s) 203 include "on-demand computing," "software as a service (SaaS)," "platform computing," "network-accessible platform," "cloud services," "data centers," and so forth.

Each of the servers 203(1)-(P) include a processor 517 and memory 519, which may store or otherwise have access to an inventory management system 150, which may include or provide image processing (e.g., for user identification, expression identification, and/or item identification), inventory tracking, order processing and/or location determination.

The network 202 may utilize wired technologies (e.g., wires, USB, fiber optic cable, etc.), wireless technologies (e.g., RF, IR, NFC, cellular, satellite, Bluetooth, etc.), or other connection technologies. The network 202 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some implementations, the inventory management system 150 and/or the item images data store, may be utilized to process images received from multiple material handling facilities. For example, the remote computing resources 203 may communicate over the network 202 with multiple material handling facilities to control picking and/or storage of items and to provide instructions to mobile drive units 354 and/or agents 406.

Figure 6:
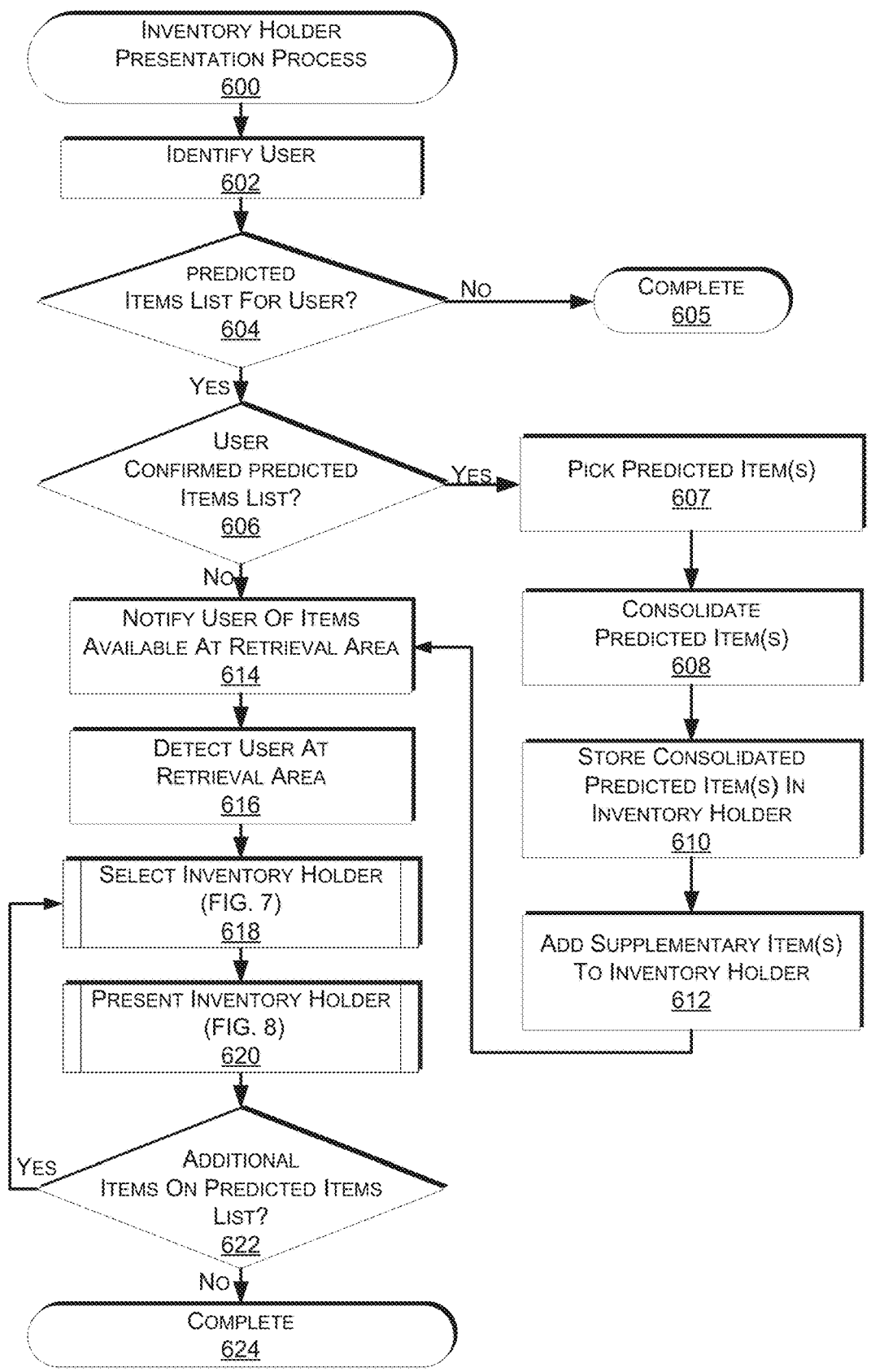
FIG. 6 is a flow diagram of an example inventory holder presentation process, according to some implementations.

FIG. 6 depicts a flow diagram of an example inventory holder presentation process 600, according to some implementations. The process of FIG. 6 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 600 begins by identifying a user, as in 602. User identification may be done using a variety of techniques. For example, the user may be identified using facial recognition, based on an identifier provided by the user, based on an identifier carried by the user, and/or any combination thereof. In some implementations, the user may be identified as they near the materials handling facility. For example, the user may provide the inventory management system with an identification of the automobile (e.g., license plate), or the user may be assigned an identifier that is detected as they approach the materials handling facility.

Upon user identification, a determination is made as to whether a predicted items list for the user exists, as in 604. In some implementations, the inventory management system may maintain a user account for each user. Each time a user interacts with the materials handling facility, such as picking items, ordering items, purchasing items, etc., the inventory management system maintains information about those interactions. Based on the user's actions and/or other information, a determination can be made as to what items are likely of interest to the user (predicted items). Other information includes, for example, items already picked by the user, items that go well with items picked by the user, items picked by other users determined to have similar picking habits to the picking habit of the user, etc. For example, if the user purchases the same five items each time they arrive at the materials handling facility, it can be determined with a high probability that the user will pick those five items during their next trip to the materials handling facility. A predicted items list for a user may be generated at any time. For example, a predicted items list for a future trip by the user to the materials handling facility may be generated as they are completing a current trip to the materials handling facility. The predicted items list may then be provided to the user for review, modification and/or confirmation at a time prior to their next trip to the materials handling facility. Likewise, the predicted items list may be updated based on, for example, a time since the user last visited the materials handling facility.

If it is determined that a predicted items list does not exist for the user, the example process completes, as in 605. However, if it is determined that a predicted items list does exist for the user, a determination is made as to whether the user has provided a confirmation that those items are of interest, as in 606. In some implementations, the predicted items list may be presented to the user as they arrive at the materials handling facility and/or before they arrive at the materials handling facility. The user may review the predicted items list, confirm which of the items are of interest, add items and/or remove items from the predicted items list.

If it is determined that the items on the predicted items list have been confirmed, the item(s) identified on the predicted items list are picked, as in 607. As noted above, the items are maintained in a storage area at the materials handling facility 100. The inventory management system may provide picking instructions to one or more agents and/or one or more mobile drive units to pick the items from the storage area and/or retrieve inventory holders from the storage area that contain items to be picked. As items are picked, they may be transferred to the consolidation area and consolidated, as in 608. For example, items may be placed into one or more containers (e.g., bags) and/or consolidated onto an inventory holder, as in 610. In some implementations, one or more supplementary items may be added to the inventory holder, as in 612. Supplementary items may be, for example, promotional items, free samples, items often purchased with the predicted items, etc. Once all of the predicted items and, optionally, the supplementary items have been picked and consolidated onto an inventory holder, the inventory holder is stored in a buffer area.

Upon item consolidation, or if it is determined that the user has not confirmed an interest in the predicted items, the user may receive a notification that predicted items are available for them at the retrieval area, as in 614.

While the example process 600 describes consolidating items if it is determined that the user has confirmed that the predicted items are of interest, in other implementations, predicted items may be consolidated into an inventory holder without user confirmation of interest of the predicted items list. For example, if a potential of the items being of interest is determined to exceed a defined threshold, the items may be consolidated into an inventory holder. In still other examples, regardless of the potential, items on the predicted items list may be consolidated into an inventory holder.

At some point after notifying the user, the user may be detected as arriving at the retrieval area, as in 616. User identification may be done using a variety of techniques. For example, the user may be identified using facial recognition, based on an identifier provided by the user, based on an identifier carried by the user, and/or any combination thereof. For example, if the user is located at the retrieval area, one or more images of the user may be captured and provided to the inventory management system. The inventory management system may process the images using facial recognition to identify the user. In other implementations, the user may provide identification to the retrieval area.

Upon detecting the user at the retrieval area, the user is assigned or selects an item delivery area and a first inventory holder is selected for presentation to the user, as in 618. Selecting an inventory holder is discussed further below with respect to FIG. 7. Upon selecting an inventory holder, the inventory holder is delivered to the retrieval area, docked with the item delivery area and presented to the user, as in 620. Example techniques for presenting an inventory holder to the user are discussed further below with respect to FIG. 8.

After an inventory holder has been presented to the user at the item delivery area, a determination is made as to whether any additional predicted items are to be presented to the user, as in 622. If it is determined that additional predicted items are to be presented to the user, the example process 600 returns to block 618 and continues. If it is determined that there are no additional predicted items to present to the user, the example process 600 completes, as in 624.

Figure 7:
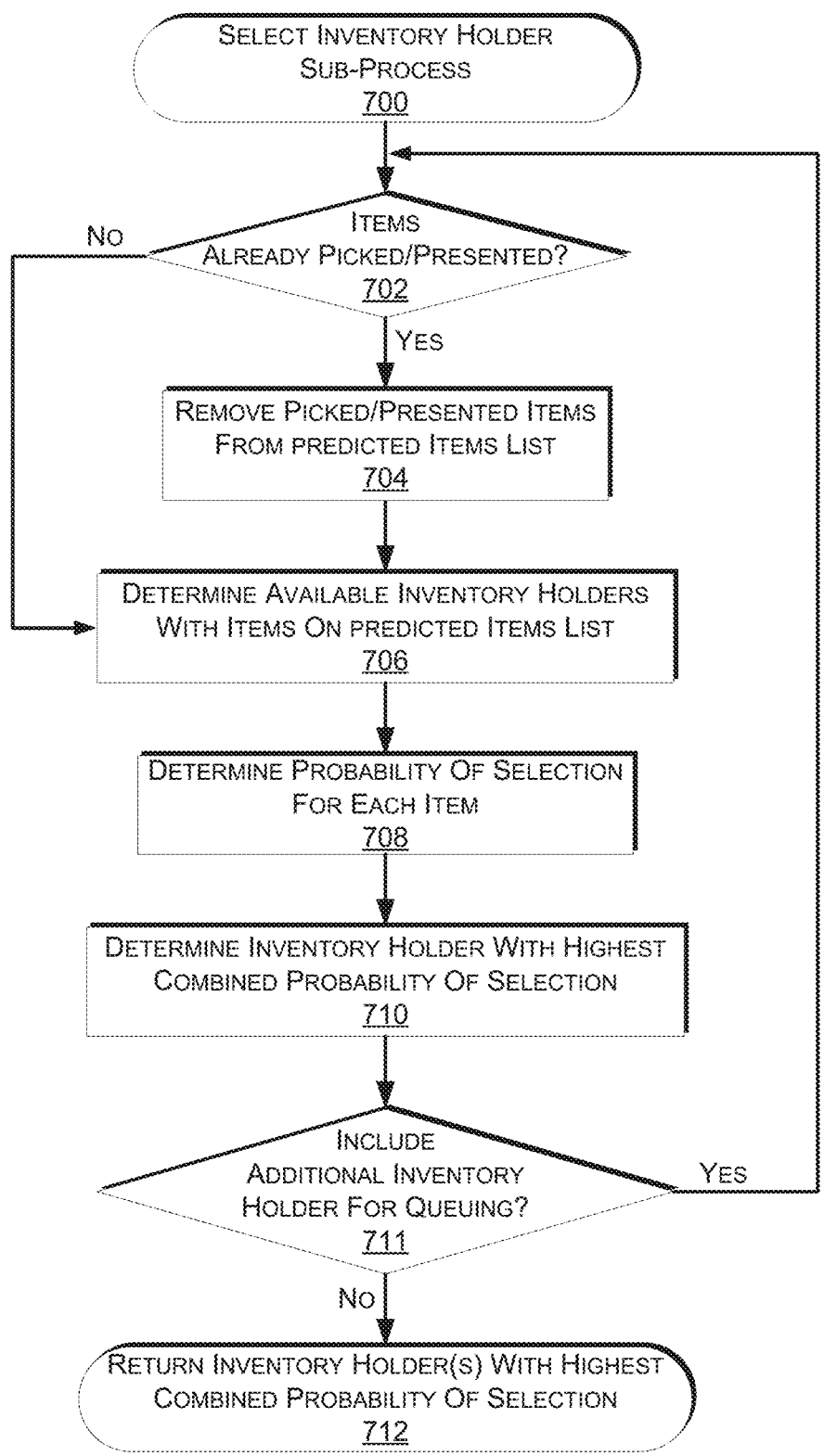
FIG. 7 is a flow diagram of an example inventory holder selection sub-process, according to some implementations.

FIG. 7 is a flow diagram of an example inventory holder selection sub-process 700. The example sub-process 700 begins by determining if the user has picked any items and/or been presented any items identified on the predicted items list, as in 702. For example, a user may arrive at a materials handling facility and pick one or more items before the user reaches the retrieval area and/or pick items from an inventory location at the retrieval area. As another example, some of the predicted items may have already been presented to the user on an inventory holder. If it is determined that the user has already picked one or more of the predicted items and/or any of the predicted items have already been presented, those predicted items are removed from consideration.

After removing any predicted items from the predicted items list that have already been picked and/or presented, or after a determination that the user has not picked and/or been presented any items, available inventory holders that contain items on the predicted item list associated with the user are identified, as in 706. An available inventory holder may be any inventory holder that is currently not in use for delivery of an item for presentation to a user. In some implementations, an available inventory holder may hold more than one of the items identified on the predicted items list.

A probability of item selection is also determined for each item included on the predicted items list, as in 708. A discussed above, items may be added to the predicted items list based on a probability that the user will pick the item while in the materials handling facility. The probability may be determined based on, for example, the past pick frequency of the item by the user, the pick frequency by other users, the likelihood that the item will be picked based on other items picked by the user, etc.

Based on the probability for each item, the available inventory holder with the highest combined probability of items is determined as the inventory holder to be identified and returned to the example process 600 (FIG. 6), as in 710. For example, if one inventory holder contains three of five items identified on the predicted items list, it may be determined that the combined probability of those three items is higher than the probability of the other items. In some implementations, rather than returning the inventory holder with the highest combined probability, the inventory holder with the predicted item that has the single highest probability of selection may be returned.

A determination may then be made as to whether multiple inventory holders are to be identified and returned to the example process 600 for retrieval and delivery to the retrieval area, as in 711. For example, if inventory holders are to be queued at the retrieval area, multiple inventory holders may be identified and a presentation order for each identified inventory holder returned. If it is determined that multiple inventory holders are to be identified, the example sub-process 700 returns to decision block 702 and continues. In such an example, items included on the first inventory to be returned are removed from consideration at decision block 702 and the next inventory holder is determined.

If it is determined that no addition inventory holders are to be identified, the example process returns an identifier of the inventory holder(s) with highest combined probability of item selection, as in 712. In some implementations, rather than returning the inventory holder with the highest combined probability, the inventory holder with the predicted item that has the single highest probability of selection may be returned.

Figure 8:
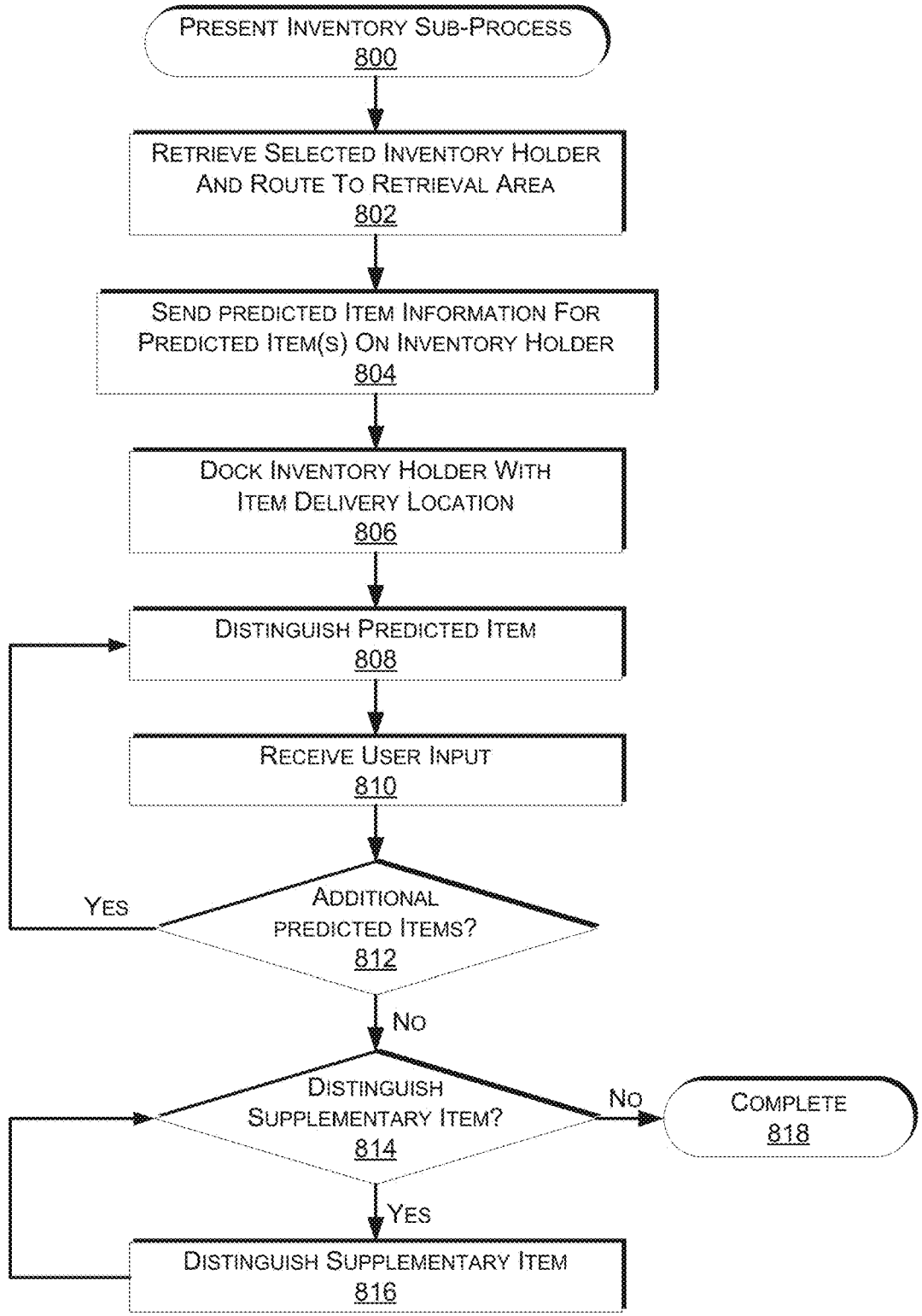
FIG. 8 is a flow diagram of an example inventory presentation sub-process, according to some implementations.

FIG. 8 is a flow diagram of an example inventory presentation sub-process 800, according to an implementation. The example sub-process 800 begins by sending instructions to a mobile drive unit to retrieve the selected inventory holder and deliver it to a retrieval area, as in 802. When a mobile drive unit receives instructions to retrieve an inventory holder, the mobile drive unit will move to the current location of the inventory holder, engage or lift the inventory holder and deliver the inventory holder to the retrieval area.

While the inventory holder is being routed to the retrieval area, predicted item information for predicted items included on the inventory holder are sent for presentation to the user, as in 804. For example, if the inventory holder contains "Item A," which is one of the predicted items, information about Item A may be sent to a device or display for presentation to the user. The item information may include, for example, a graphical representation of the item, a price for the item, a size of the item, item contents and/or ingredients, etc. The item information may be sent to a display at the control station, a portable device associated with the user, and/or any other output device within the materials handling facility.

When the inventory holder reaches the retrieval area, it may be queued up for later presentation to the user (e.g., positioned behind the control station) or the mobile drive unit may receive instructions to position the inventory at the item delivery area. When positioned at the item delivery area, the inventory holder may be docked with the item delivery area and the barrier may be repositioned to allow user access to inventory items located on the inventory holder, as in 806. Docking of the inventory holder may include, for example, positioning the inventory holder at the item delivery area and/or securing the inventory holder to the item delivery area. For example, the item delivery area may have one or more engagement arms that, when activated, engage and secure the inventory holder to the item delivery area. Once secured, the barrier may transition out of the way to enable access by a user to the inventory included in the inventory holder. The docking of the inventory holder may also be configured to provide power to the inventory holder to enable illumination of lights, sensors, refrigeration, scales, etc., within the inventory holder.

Upon docking the inventory holder and providing access to the inventory, the one or more predicted items may be distinguished from other items on the inventory holder, as in 808. For example, an illumination element (e.g., light) within the inventory holder may be illuminated to highlight the predicted item to the user. In another implementation, other illumination elements that do not illuminate the predicted item may be dimmed so that the predicted item is distinguished. In still other examples, an illumination element of the retrieval area may be activated and configured to project light or otherwise illuminate the predicted item.

After distinguishing the predicted item, a user input is received, as in 810. The user input may include the user picking the preselected item or indicating that they are not interested in the preselected item. For example, if the user does not want to pick the presented predicted item, they may provide an input to view the next predicted item. For example, the user may provide an input to a touch-based display at the retrieval area and/or provide an input via a portable device associated with the user.

After receiving the user input, a determination is made as to whether additional predicted items are located on the inventory holder that have not yet been presented to the user, as in 812. If it is determined that additional predicted items are on the inventory holder that have not yet been presented to the user, the example process 800 returns to block 808 and continues. However, if it is determined that no additional predicted items are included in the inventory holder, a determination is made as to whether a supplementary item included on the inventory holder is to be distinguished, as in 814. If it is determined that a supplementary item is to be distinguished, that supplementary item is selected and distinguished using, for example, one or more of the distinguishing techniques discussed above, as in 816. After distinguishing a supplementary item, the example sub-process 800 returns to block 814 and continues. If it is determined that no supplementary items on the inventory holder are to be distinguished, the example sub-process 800 completes, as in 818.

At any time a user may pick one or more items from a presented inventory holder. When the user picks an item, the removal of the item may be determined based on, for example, a scale, load cell, pressure sensor, etc. located within the inventory holder detecting a decrease in weight on a shelf of the inventory holder resulting from the item pick. The inventory management system may maintain inventory information identifying the inventory stored on each shelf of the inventory holder and based on the location of the determined pick may identify the item. An item identifier associated with the identified item may then be added to a user item list associated with the user.

Alternatively, or in addition thereto, one or more images of the item may be captured as the item is picked. Those images may be processed using, for example, object, image and/or edge detection techniques and compared with stored item information to identify the item. In still other examples, one or more active tags and/or visual tags may be included on the picked item that are detected and utilized to identify the picked item.

Figure 9:
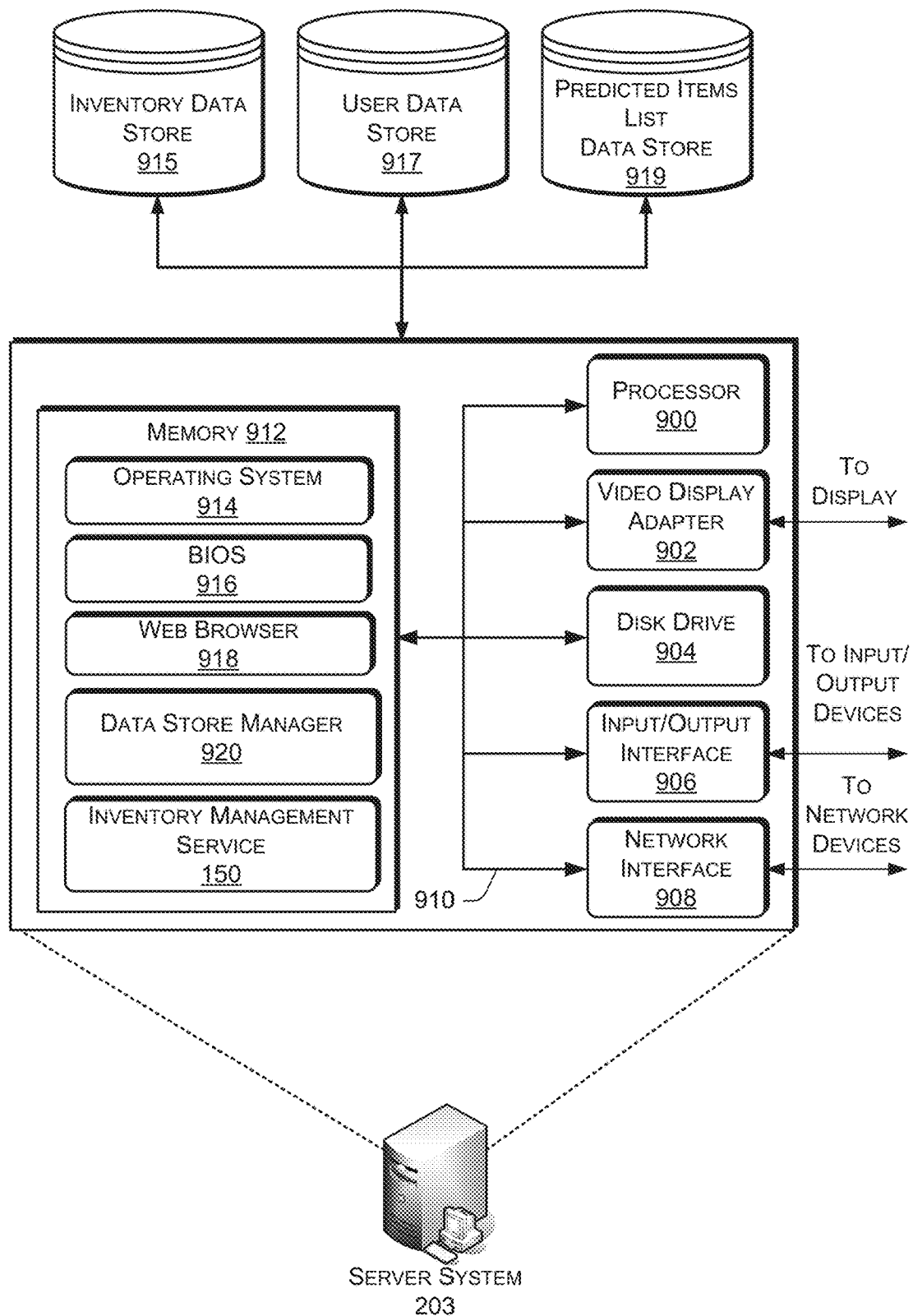
FIG. 9 is a block diagram of an illustrative implementation of a server system that may be used with various implementations, such as the remote computing resources.

FIG. 9 is a pictorial diagram of an illustrative implementation of a server system, such as the remote computing resource 203 (FIG. 5) that may be used in the implementations described herein. The remote computing resource 203 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an operator of the remote computing resource 203 to monitor and configure operation of the remote computing resource 203. The input/output interface 906 likewise communicates with external input/output devices not shown in FIG. 9, such as a mouse, keyboard, scanner, or other input and output devices that can be operated by an operator of the remote computing resource 203. The network interface 908 includes hardware, software, or any combination thereof, to communicate with other computing devices. For example, the network interface 908 may be configured to provide communications between the remote computing resource 203 and other computing devices via the network 202, as shown in FIG. 5.

The memory 912 generally comprises random access memory (RAM), read-only memory (ROM), flash memory, and/or other volatile or permanent memory. The memory 912 is shown storing an operating system 914 for controlling the operation of the remote computing resource 203. A binary input/output system (BIOS) 916 for controlling the low-level operation of the remote computing resource 203 is also stored in the memory 912.

The memory 912 additionally stores program code and data for providing network services that allow the inventory management system 150 to track items removed from inventory holders, generate predicted items lists, and/or to fulfill selected items to users. Accordingly, the memory 912 may store a browser application 918. The browser application 918 comprises computer executable instructions, that, when executed by the processor 900, generate or otherwise obtain configurable markup documents such as Web pages. The browser application 918 communicates with a data store manager application 920 to facilitate data exchange between the inventory data store 915, the user data store 917 and/or the predicted items list data store 919.

As used herein, the term "data store" refers to any device or combination of devices capable of storing, accessing and retrieving data, which may include any combination and number of data servers, databases, data storage devices and data storage media, in any standard, distributed or clustered environment. The remote computing resource 203 can include any appropriate hardware and software for integrating with the data stores 915, 917, 919 as needed to execute aspects of the inventory management system 150.

The data stores 915, 917, 919 can include several separate data tables, databases or other data storage mechanisms and media for storing data relating to a particular aspect. For example, the data stores 915, 917, 919 illustrated include mechanisms for inventory information, user information, etc., which can be used to identify an item removed from an inventory location and/or placed into an inventory location.

It should be understood that there can be many other aspects that may be stored in the data stores 915, 917, 919. The data stores 915, 917, 919 are operable, through logic associated therewith, to receive instructions from the remote computing resource 203 and obtain, update or otherwise process data in response thereto.

The memory 912 may also include the inventory management system 150, discussed above. The inventory management system 150 may be executable by the processor 900 to implement one or more of the functions of the remote computing resource 203. In one implementation, the inventory management system 150 may represent instructions embodied in one or more software programs stored in the memory 912. In another implementation, the inventory management system 150 can represent hardware, software instructions, or a combination thereof.

The remote computing resource 203, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A materials handling facility apparatus, comprising:
   a consolidation area to receive a plurality of predicted items from a plurality of items in a storage area, wherein the plurality of predicted items:
      are determined to be of potential interest to a user; and
      are picked from the storage area in response to a determination that the user has arrived or is expected to arrive at the materials handling facility apparatus; and
   a retrieval area to receive the plurality of predicted items and present the plurality of predicted items to the user.

2. The materials handling facility apparatus of claim 1, wherein the retrieval area is separate from the storage area and the consolidation area.

3. The materials handling facility apparatus of claim 1, further comprising:
   a buffer area to receive the plurality of predicted items for the user from the consolidation area until the plurality of predicted items are presented to the user at the retrieval area.

4. The materials handling facility apparatus of claim 1, wherein the plurality of predicted items are included on a predicted items list associated with the user and are determined based at least in part on one or more of items already picked by the user, items that go well with items already picked by the user, items picked by other users having similar picking habits to a picking habit of the user, a time since a last visit by the user to the materials handling facility apparatus, or a user action of the user.

5. The materials handling facility apparatus of claim 1, further comprising:
   a barrier that is operable to move and allow access to the plurality of picked items in the retrieval area.

6. A system, comprising:
   a materials handling facility, including:
      a consolidation area to receive a plurality of predicted items for a user from a plurality of items in a storage area and consolidate the plurality of predicted items into a consolidated plurality of predicted items; and
      a retrieval area to receive the consolidated plurality of predicted items and present the consolidated plurality of predicted items to the user;
   one or more processors; and
   a memory storing program instructions that, when executed by the one or more processors, cause the one or more processors to at least:
      determine the plurality of predicted items included on a predicted items list associated with the user, the plurality of predicted items of potential interest to the user;
      send a first instruction to cause a first item of the plurality of predicted items to be picked from a first location within the storage area and transported to the consolidation area;
      send a second instruction to cause a second item to be picked from a second location within the storage area and transported to the consolidation area;
      send a third instruction that causes, at the consolidation area, the first item and the second item to be consolidated into the consolidated plurality of predicted items; and
      send a fourth instruction that causes the consolidated plurality of predicted items to be transported to the retrieval area and presented to the user while the user is positioned at the retrieval area.

7. The system of claim 6, further comprising:
   a buffer area to maintain the consolidated plurality of predicted items; and
   wherein:
      the program instructions that, when executed by the one or more processors, further cause the one or more processors to at least send a fifth instruction that causes the consolidated plurality of predicted items to be transported from the consolidation area to the buffer area and maintained at the buffer area until the consolidated plurality of predicted items are to be transported to the retrieval area; and
      the fourth instruction causes the consolidated plurality of predicted items to be transported from the buffer area to the retrieval area.

8. The system of claim 6, wherein:
   the retrieval area includes an item delivery area to receive the consolidated plurality of predicted items; and
   the item delivery area is configured to enable or disable user access by the user to the consolidated plurality of predicted items when the consolidated plurality of predicted items are located at the item delivery area.

9. The system of claim 6, wherein the program instructions that, when executed by the one or more processors, further cause the one or more processors to at least:
   prior to sending the first instruction:
      send a fifth instructions to cause the predicted items list to be presented to the user; and
      receive a confirmation that the user is interested in the first item.

10. The system of claim 6, wherein the program instructions that, when executed by the one or more processors, further cause the one or more processors to at least:
    detect an identifier associated with the user as the user approaches the materials handling facility; and
    in response to detection of the identifier, determine that the user has arrived at the materials handling facility.

11. The system of claim 10, wherein the identifier is at least one of provided by the user or carried by the user.

12. The system of claim 6, wherein at least one item of the plurality of predicted items is determined based at least in part on one or more of items already picked by the user, items that go well with items already picked by the user, items picked by other users having similar picking habits to a picking habit of the user, a time since a last visit by the user to the materials handling facility, or a user action of the user.

13. The system of claim 6, wherein the program instructions that, when executed by the one or more processors, further cause the one or more processors to at least:
    send, to the user, a notification that the consolidated plurality of predicted items are available for the user at the retrieval area.

14. The system of claim 6, wherein the program instructions that, when executed by the one or more processors, further cause the one or more processors to at least:
    detect an arrival of the user at the retrieval area; and
    in response to detection of the arrival, send a fifth instruction that causes the consolidated plurality of predicted items to be delivered to an item delivery area within the retrieval area for presentation to the user.

15. A materials handling facility apparatus, comprising:
    a storage area to store a plurality of items;
    a consolidation area to receive a plurality of predicted items from the plurality of items in the storage area and consolidate the plurality of predicted items into a consolidated plurality of predicted items; and a retrieval area to receive the consolidated plurality of predicted items and present the consolidated plurality of predicted items.

16. The materials handling facility apparatus of claim 15, wherein the plurality of predicted items are picked from the storage area based at least in part on a determination that a user has arrived or is expected to arrive at the materials handling facility apparatus.

17. The materials handling facility apparatus of claim 15, further comprising:

a buffer area to receive the consolidated plurality of predicted items from the consolidation area until the items are presented at the retrieval area.

18. The materials handling facility apparatus of claim 15, wherein:

the retrieval area includes an item delivery area to receive the consolidated plurality of predicted items.

19. The materials handling facility apparatus of claim 15, wherein the plurality of predicted items are determined to be of potential interest to a user.

20. The materials handling facility apparatus of claim 15, wherein the materials handling facility apparatus is at least one of a warehouse, a distribution center, a cross-docking facility, an order fulfillment facility, a packaging facility, a shipping facility, a rental facility, a library, a retail store, a wholesale store, or a museum.

* * * * *